(12) United States Patent
Lamers et al.

(10) Patent No.: US 7,632,570 B2
(45) Date of Patent: Dec. 15, 2009

(54) AQUEOUS RESINOUS BINDERS

(75) Inventors: Paul H. Lamers, Allison Park, PA (US); Christopher A. Verardi, Pittsburgh, PA (US); Michele L. Meli, Ambridge, PA (US); Carolyn A. K. Novak, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 336 days.

(21) Appl. No.: 11/773,475

(22) Filed: Jul. 5, 2007

(65) Prior Publication Data

US 2008/0070040 A1 Mar. 20, 2008

Related U.S. Application Data

(63) Continuation-in-part of application No. 11/533,518, filed on Sep. 20, 2006.

(51) Int. Cl.
| | |
|---|---|
| B32B 27/38 | (2006.01) |
| B32B 27/30 | (2006.01) |
| B32B 27/36 | (2006.01) |
| B32B 27/40 | (2006.01) |
| C08L 33/00 | (2006.01) |
| C08L 63/00 | (2006.01) |
| C08L 67/00 | (2006.01) |
| C08L 75/04 | (2006.01) |
| B05D 1/36 | (2006.01) |
| B05D 1/38 | (2006.01) |

(52) U.S. Cl. .................... 428/414; 428/413; 428/423.1; 428/480; 428/500; 523/402; 523/435; 525/437; 525/438; 525/440.01; 525/444; 525/445; 525/448; 525/449; 525/453; 525/454; 525/455; 525/528; 525/529; 525/530; 525/531; 525/532; 525/533; 525/538

(58) Field of Classification Search ................. 428/413, 428/414, 423.1, 480, 500; 523/400, 402, 523/435; 525/418, 419, 437, 438, 440, 444, 525/445, 448, 449, 452, 453, 454, 455, 528, 525/529, 530, 531, 532, 533, 538, 540
See application file for complete search history.

(56) References Cited

U.S. PATENT DOCUMENTS

| 4,978,708 A | 12/1990 | Fowler et al. ............... 524/507 |
| 5,071,904 A | 12/1991 | Martin et al. ............... 524/458 |
| 5,667,847 A | 9/1997 | Muller et al. ............ 427/385.5 |
| 5,739,194 A | 4/1998 | Natesh et al. ............... 524/457 |
| 6,369,133 B2 | 4/2002 | Kitabatake .................. 523/410 |
| 7,163,979 B2 | 1/2007 | Okazaki et al. ............. 524/539 |
| 2004/0159555 A1 * | 8/2004 | Purdy et al. ................. 205/198 |

FOREIGN PATENT DOCUMENTS

EP 1 454 971 B1 2/2006

\* cited by examiner

*Primary Examiner*—Michael J Feely
(74) *Attorney, Agent, or Firm*—Robert A. Diaz

(57) ABSTRACT

Aqueous resinous binders comprising graft copolymers, water-dilutable urethane polyols, epoxy-phosphorus acid reaction products, and an aqueous dispersion comprising the reaction product of trimellitic anhydride and a polyol, wherein the molar ratio of trimellitic anhydride to the polyol in the reaction product ranges from 1:2 to 1:4, and wherein the reaction product is further reacted with an anhydride to form another reaction product are disclosed. The binders are useful in primer formulations for automotive applications.

26 Claims, No Drawings

US 7,632,570 B2

AQUEOUS RESINOUS BINDERS

CROSS REFERENCE TO RELATED APPLICATIONS

This application is a Continuation in Part of co-pending U.S. patent application Ser. No. 11/533,518, filed Sep. 20, 2006.

FIELD OF THE INVENTION

The present invention relates to aqueous resinous binders, and more particularly, to aqueous resinous binders useful in the formulation of primer coatings for automotive applications.

BACKGROUND OF THE INVENTION

Cured coatings for automotive applications such as primers and topcoats must have a number of desirable properties. First of all, they should contain low amounts of organic solvent for environmental reasons and should contain a high solids content so that a maximum amount of resin and pigment is transferred to the substrate surface. Cure response should be complete at a relatively low temperature and physical properties of the resultant coating such as adhesion, solvent resistance and appearance should meet automotive standards. Attaining all of these characteristics is difficult and often certain properties have to be compromised so that other properties can be upgraded to meet automotive standards.

The present invention provides for an aqueous binder comprising a blend of resins that provide a particularly desirable blend of properties for automotive applications. The binders, when formulated with color-imparting pigments for color applications, are of relatively high solids content, cure at low temperatures and provide for good physical properties such as adhesion, solvent resistance and appearance.

SUMMARY OF THE INVENTION

The present invention provides for an aqueous resinous binder comprising:

(a) polymer microparticles obtained by aqueous phase addition polymerization of a monomer component comprising one or more addition polymerizable ethylenically unsaturated monomers in the presence of a polymer dispersed in an aqueous medium in which the polymer is selected from polyester, polyurethane and an acrylic copolymer including mixtures thereof, (b) a water-dilutable urethane polyol, and (c) a hydroxyl group-containing material derived from the reaction of an epoxy group-containing material with a phosphorus acid; and (d) an aqueous dispersion comprising the reaction product of trimellitic anhydride and a polyol, wherein the molar ratio of trimellitic anhydride to said polyol in said reaction product ranges from 1:2 to 1:4, and wherein said reaction product is further reacted with an anhydride to form another reaction product.

DETAILED DESCRIPTION OF THE INVENTION

The aqueous resinous binder described above has a resin solids content of from 20 to 60 percent by weight based on total weight of (a)+(b)+(c)+(d) and a hydroxyl value between 75 to 250.

As used herein, the term "polyol" or variations thereof refers broadly to a material having an average of two or more hydroxyl groups per molecule. It will be understood, however, that a "polyol" residue or moiety in a reaction product encompasses a material that may have one or more hydroxyl groups per molecule.

The polymer that is used in the preparation of the polymeric microparticles is selected from a polyester, a polyurethane or an acrylic copolymer including mixtures thereof. The polymer is dispersed in aqueous medium and may contain acid functionality that can be at least partially neutralized with a base such as an organic amine to assist in dispersing the polymer in water. In an embodiment, prior to neutralization, the polymer may have an acid value of from 10 to 60, or from 20 to 40. The acid value is determined in accordance with ASTM D-1639.

In an embodiment, the polymer is a polyester. Polyesters can be prepared by condensing one or more polycarboxylic acids with one or more polyols by techniques well known in the art.

Generally, the reaction can be conducted by combining the ingredients and heating to a temperature of from 160° C. to 220° C. The polyesterification reaction may be conducted under azeotropic conditions using any solvent that forms a good azeotrope with water, for example xylene or 1-decene. The amount of azeotropic solvent generally ranges from 3 percent to 4 percent, based on the total weight of reactants used in preparing the polyester. In an embodiment, during the course of the polyesterification, most of the polyester is formed in a temperature range of from 170° C. to 220° C. The temperature during the entire course of the reaction may range from 160° C. to 220° C.

In an embodiment, the polyester may be prepared from 40 percent to 90 percent of a polyol or mixture of polyols, each having a formula molecular weight ranging from 50 to 2,000. The amount of polyol may range from 50 percent to 80 percent; the percentages based on the total weight of reactants used in preparing the polyester. The polyol may be a diol or triol although polyols of higher functionality can be used. In an embodiment, the polyol has a formula molecular weight of from 75 to 1000, or from 100 to 300. Non-limiting examples of suitable polyols may include but are not limited to ethylene glycol, diethylene glycol, glycerol, trimethylpentane diol, cyclohexane diol, 1,6-hexanediol, trimethylolpropane, pentaerythritol, neopentyl glycol, ethoxylated trimethylolpropane and mixtures thereof.

The polyol as described above is reacted with a polycarboxylic acid or anhydride thereof. Any suitable polycarboxylic acid or anhydride thereof known in the art may be used. The polycarboxylic acids or anhydrides which are useful may include for example, adipic acid, succinic acid, suberic acid, pimeric acid, isophthalic acid, azelaic acid, sebacic acid, maleic acid, glutaric acid, dodecanedioic acid, terephthalic acid, chlorendic acid, cyclohexane carboxylic acid, hexahydrophthalic anhydride, dimer fatty acids such as those available under the trademark PRIPOL from Unichema, or mixtures thereof. In an embodiment, a portion such as from 0 to 10 percent by weight of the polycarboxylic acid, will have alpha, beta-ethylenic unsaturation in the backbone based on total weight of reactants used to prepare the polyester. Non-limiting examples of such polycarboxylic acids may include maleic acid, fumaric acid and itaconic acid.

The polycarboxylic acids or anhydride thereof generally range from 10 percent to 60 percent, or from 15 to 50 percent, the percentage based on the total weight of reactants used in preparing the polyester. The ingredients used in preparing the polyester can also include higher polycarboxylic acids such as trimellitic acid and tricarballylic acid. Also, lower alkyl esters of such acids, where they exist, such as dimethyl glutarate and dimethyl terephthalate can be used.

In an embodiment, to incorporate acid functionality into the polyester, the equivalent ratio of acid to hydroxyl in the reactants may be greater than 1. Alternatively, reactants, such as bishydroxyalkyl carboxylic acid such as dimethylolpropionic acid or the use of polycarboxylic acids whose carboxyl groups differ in reactivity with respect to condensation such as citric acid or trimellitic acid, can be used. By using such techniques, polyesters containing both carboxylic acid and hydroxy groups may be prepared. Such polyesters useful in the practice of the invention optionally have hydroxyl values of from 50 to 300.

The polyesters useful in the practice of the invention may have number average molecular weights of from 800 to 6000 based on polystyrene standards.

As mentioned above, the acid functional polymer is at least partially neutralized with a base to form an aqueous dispersion of the polymer in water. Suitable bases may include those known in the art. Non-limiting examples are organic amines such as trimethylamine, diethylamine and dimethylethanolamine. The degree of neutralization may be at least 60 percent of the total theoretical neutralization equivalent.

Besides polyesters as described above, polyurethanes can also be used as the polymer. Any known polyurethanes may be used. Suitable polyurethanes can be prepared by reacting a hydroxyl/carboxylic acid functional polyester such as those described above with a polyisocyanate. Alternatively, the polyisocyanate can be reacted with a material such as a polyester, polyether, polycarbonate, polylactone or polyacrylate containing terminal hydroxy groups such that the intermediate product has terminal isocyanate groups that are subsequently reacted with a compound that is reactive with the isocyanate groups and has at least one group capable of forming an anion. This group is subsequently at least partially neutralized with a base such as the organic amine to form the water-dispersible polyurethane.

Any polyisocyanate known in the art may be used. Suitable polyisocyanates that may be used include toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 4,4-biphenylene diisocyanate, 1,5-naphthalene diisocyanate, bis-(4-isocyanatocyclohexyl)-methane, bis-(4-isocyanatocyclophenyl)-methane, 4,4-diisocyantodiphenylether, tetramethylxylene diisocyanate and the like. In an embodiment, the polyisocyanate may constitute from 10 to 45 percent by weight of the polyurethane based on total weight of the reactants used to prepare the polyurethane.

Compounds that are reactive with the isocyanate groups and have a group capable of forming an anion may be chosen from a wide variety of known compounds such as but not limited to dihydroxypropionic acid, dimethylolpropionic acid, dihydroxysuccinic acid and dihydroxybenzoic acid. These compounds when used may be present in amounts of up to 12 percent by weight based on total weight of the reactants.

Any polylactones can be used to form the polyurethane and may include lactones such as a caprolactone reacted with a diol. In an embodiment, the lactone is epsilon-caprolactone since it is readily available. Suitable aliphatic diols that can be used to make the polylactone can include ethylene glycol, 1,3-propanediol, 1,4-butanediol, dimethylolcyclohexane and mixtures thereof.

Any polyethers can be used to form the polyurethane and may include polypropylene glycols having an average molecular weight of from 400-4500. Non-limiting examples of polypropylene glycols can be those designated as Niax 425, 2025, 3025, 4025 (available from Union Carbide) and the like. (The numbers designate the molecular weight of the polypropylene glycols).

The polyurethane material may be formed by combining the above-identified components in any suitable arrangement known to one of ordinary skill in the art. For example, in preparing the polyurethane, the components may be combined in a single step or the polyisocyanate and the active hydrogen-containing material may be prereacted under suitable conditions to form a prepolymer prior to reaction with one or more of the remaining components. Any suitable reaction temperatures may be used to form the prepolymer such as, for example, those reaction temperatures that range from 50° C. to 180° C.

Suitable polyacrylate resins according to the invention comprise:

i) from 1 to 30 percent by weight of an ethylenically unsaturated carboxylic acid or anhydride or mixtures thereof, ii) from 20 to 90 percent other ethylenically unsaturated monomers, iii) from 0 to 50 percent by weight of an ethylenically unsaturated monomer with a functional group other than the carboxylic acid group or the carboxylic anhydride group such as hydroxyl group.

Suitable ethylenically unsaturated carboxylic acid monomers (i) may include acrylic acid, methacrylic acid, crotonic acid, fumaric acid, maleic acid or maleic anhydride, itaconic acid or itaconic anhydride, monoalkylesters of maleic, itaconic or fumaric acids, and mixtures thereof.

The other ethylenically unsaturated monomers (ii) may be chosen from acrylic or methacrylic alkyl ester derived from alcohols having from 1 to 20 carbon atoms, or vinyl monomers. The expression (meth)acrylate with parenthesis as used herein includes methacrylate and acrylate. Suitable examples include methyl(meth)acrylate, ethyl(meth)acrylate, propyl (meth)acrylate, n-butyl (meth)acrylate, isobutyl(meth)acrylate, t-butyl(meth)acrylate and 2-ethylhexyl (meth)acrylate, maleic acid or fumaric acid dialkylesters in which the alkyl groups have 1 to 20 carbon atoms, vinylaromatics such as styrene, alpha-methylstyrene, vinyltoluene, t-butylstyrene, halogenated vinylbenzenes such as chlorostyrene, and other monomers like vinylchloride, (meth)acrylamide and (meth) acrylonitrile.

Examples of ethylenically unsaturated monomers with a functional group other than the carboxylic acid group or the carboxylic anhydride group (iii) may include hydroxyethyl (meth)acrylate, hydroxypropyl(meth)acrylate, and hydroxybutyl (meth)acrylate.

Copolymerization is carried out using conventional techniques such as heating the monomers in the presence of a polymerization initiating agent and optionally chain transfer agents. The copolymerization may be carried out in bulk or solution. In an embodiment solvent may be present to act as a cosolvent during dispersion. Any suitable solvent may be used. Suitable solvents for solution polymerization include ethylene glycol or propylene glycol and their derivatives, such as dipropylene glycol monomethyl ether and ethylene glycol monobutyl ether acetate; alcohols, such as butyl alcohol and diacetone alcohol; ketones, such as methyl propyl ketone and acetone; esters, such as butyl acetate and pentyl propionate; ethers, such as dioxane and tetrahydrofuran; and other compatible solvents, such as water and N-methylpyrrolidone and mixtures thereof. In an embodiment, the solvent is a mixture of ethylene glycol monobutyl ether and water.

Non-limiting examples of initiators include peroxides such as dialkylperoxides, peroxyesters, peroxydicarbonates, diacylperoxides, hydroperoxides, and peroxyketals and azo compounds such as 2,2'-azobis(2-methylbutanenitrile) and 1,1'-azobis(cyclohexanecarbonitrile).

The polyurethanes and polyacrylates are at least partially neutralized with a base as described above for the polyesters to form aqueous polymeric dispersions.

The polymeric microparticles (a) are obtained by aqueous phase addition polymerization of a polymerizable ethylenically unsaturated monomer component in the presence of the aqueous resinous dispersions mentioned above. In an embodiment, the aqueous resinous dispersions may have a resin solids content of from 20 to 60 percent by weight with 40 to 80 percent by weight water, and up to 10 percent by weight of an organic solvent.

The ethylenically unsaturated monomer component may be a mixture of monomers that is capable of free radical initiated polymerization in aqueous medium. In an embodiment, the monomer mixture contains from 0 to 40, or from 5 to 25 percent by weight of a hydroxy functional monomer, such as a hydroxyalkyl ester of acrylic or methacrylic acid having 1 to 4 carbon atoms in the alkyl group such as hydroxyethyl methacrylate and hydroxypropyl acrylate. The percentage by weight being based on total monomer weight.

The other monomer in the mixture can be selected from suitable monomers known in the art including but not limited to vinylidene halides, such as chlorides and fluorides; alkyl acrylates and methacrylates, vinyl esters of organic acids and alkyl esters of maleic and fumaric acid.

Suitable vinylidene halides that can be used may include vinyl chloride, vinylidene chloride, vinyl fluoride, vinylidene fluoride, tetrafluoroethylene, hexafluoropropylene and mixtures thereof.

Suitable alkyl acrylates and methacrylates that can be used may include those that contain from 1 to 20 carbon atoms in the alkyl groups. Examples include but are not limited to methyl acrylate, ethyl acrylate, butyl acrylate, 2-ethylhexyl acrylate, methyl methacrylate, butyl methacrylate, 2-ethylhexyl methacrylate and the like.

Suitable vinyl esters which can be used may include vinyl acetate, vinyl versatate and vinyl propionate.

Suitable esters of maleic and fumaric acid which can be used may include dibutyl maleate and diethyl fumarate.

Besides the monomers mentioned above, other polymerizable alpha, beta-ethylenically unsaturated monomers can be used and may include olefins such as ethylene and propylene; vinyl aromatic compounds such as styrene and vinyl toluene; vinyl ethers and ketones such as methyl vinyl ether and methyl vinyl ketone; conjugated dienes such as butadiene and isoprene; nitriles such as acrylonitrile; amides such as acrylamide and methacrylamide and alkoxyalkyl derivatives thereof such as N-butoxymethylmethacrylamide.

In an embodiment wherein the hydroxyl group-containing vinyl monomer constitutes from 0 to 40, or from 5 to 25 percent by weight of the monomer component, the other monomer or monomers in the mixture may constitute the remainder of the monomer component, that is, from 60 to 100 percent, or from 75 to 95 percent by weight based on total monomer weight.

The amount of the ethylenically unsaturated monomer component may vary. In an embodiment, it may be used in amounts of from 5 to 95, or from 25 to 75 percent by weight based on total solid weight of polymerizable ethylenically unsaturated monomer component and the dispersed polymer. The dispersed polymer may be present in varying amounts. In an embodiment, it may be present in an amount of from 5 to 95, or from 25 to 75 percent by weight based on total solid weight of the polymerizable ethylenically unsaturated monomer and the dispersed polymer.

With regard to the conditions of polymerization, the polymerizable ethylenically unsaturated monomer component may be addition polymerized in aqueous medium in the presence of the dispersed polymer, with a free radical initiator, comprising from 0.2 to 1.0 percent by weight based on total solid weight of the polymerizable ethylenically unsaturated monomer and dispersed polymer. The temperature of polymerization may vary. In an embodiment, it may be from 0° C. to 100° C., or from 20° to 85° C. The pH of the aqueous medium may be maintained from 5 to 12.

The free radical initiator can be selected from those known in the art and may include one or more peroxides which are known to act as free radical initiators and which are soluble in aqueous medium. Examples include but are not limited to the persulfates such as ammonium, sodium and potassium persulfate. Also, oil-soluble initiators may be employed either alone or in addition to the water-soluble initiators. Suitable oil-soluble initiators may include organic peroxides such as benzoyl peroxide, t-butyl hydroperoxide, and t-butyl perbenzoate. Azo compounds such as azobisisobutyronitrile can also be used.

The polymerization reaction may be conducted as batch, intermittent or a continuous operation. While all of the polymerization ingredients may be charged initially to the polymerization vessel, better results may be obtained with proportioning techniques.

In an embodiment, the reactor is charged with an appropriate amount of water and acid polymer salt. The reactor is then heated to 35° C. and charged with the monomer component. The initiator is then added and the reaction mixture permitted to exotherm. After the exotherm has subsided, the reaction mixture is heated to 65° C. and held for one hour.

The polymeric microparticles may be present in the aqueous resinous binder in amounts of from 40 to 90, or from 50 to 80 percent by weight on a resin solids basis based on total weight of resinous solids (a)+(b)+(c) in the aqueous resinous binder. In an embodiment, the polymeric microparticles may have a particle size of from 20 to 100 nanometers (nm). In a further embodiment, the polymeric microparticles may have hydroxyl values of from 50 to 300.

The water-dilutable urethane polyols (b) contain at least two hydroxyl groups and at least one urethane group, or at least two urethane groups. The urethane polyols may be prepared using conventional methods such as by reacting a polyamine with a cyclic carbonate. The polyamine may include linear, branched or cyclic polyamines. The polyamines may contain at least one, or at least two, primary amino groups. They may also contain further secondary or tertiary amino groups or ether groups. In an embodiment, the amines include aliphatic linear, branched or cyclic primary diamines having from 2 to 18, or from 3 to 12, carbon atoms. In a further embodiment, the amines include oligo(oxyalkylene) diamines of the formula $$H_2N-(R-O)_n-R-NH_2$$

where R may denote an ethylene or 1,2- or 1,3-propylene radical or mixtures of these radicals, and n is a number from 1 to 20. The cyclic carbonate may include a linear or branched aliphatic cyclic carbonate. The cyclic carbonates may be monocarbonates, in other words esters of carbonic acids with glycol, such as 1,2- and 1,3-propanediol and neopentyl glycol. The water-dilutable urethane polyols may also be prepared by reacting corresponding linear, branched or cyclic aliphatic isocyanates with aliphatic diols having 2 to 6 carbon atoms, such as but not limited to 1,2- and 1,3-propanediol and neopentyl glycol.

The water-dilutable urethane polyols may be used in various amounts such as the aqueous binder mixture may contain from 5 to 30, or from 10 to 25 percent by weight urethane polyol; the percentage by weight being based on total resin solids weight (a)+(b)+(c) of the aqueous resinous binder.

Component (c), the hydroxy group-containing material may be derived from conventional methods such as from reacting an epoxy group-containing material with a phosphorus acid. In an embodiment, these materials may be prepared by reacting phosphoric acid or an organic phosphonic acid that are at least dibasic with epoxy resins optionally in a solvent. The amount of the phosphoric or phosphonic acid used is normally such that all of the epoxide groups are consumed by the reaction with the acid and such that a sufficient number of acid groups is still available after the reaction. The resulting resin has hydroxyl groups (from the reaction of the oxirane group with acid functionality), these hydroxyl groups being positioned beta to the ester group, and also acid groups of the phosphoric or phosphonic acid that were not consumed by the reaction with the epoxide.

Any suitable epoxide may be used and may include those known in the art. Non-limiting examples may include polyepoxides such as but not limited to polyglycidyl ether of a polyphenol. Any suitable phosphoric or phosphonic acid may be used and may include those known in the art. Non-limiting examples may include but are not limited to orthophosphoric acid, phosphorus acid, alkanephosphonic acids having 1 to 18, or 1 to 12, carbon atoms in the alkyl radical such as methanephosphonic and ethanephosphonic acid, and also phenylphosphonic acid.

The epoxy-phosphorous reaction product may be present in the aqueous resinous binder in amounts of from 2 to 20, or from 2.5 to 15 percent by weight based on total weight of resin solids (a)+(b)+(c) in the aqueous resinous binder.

In an embodiment, the aqueous resinous binder may further comprise one or more curing agents or crosslinking materials capable of reacting with the components mentioned above to form a crosslinked film. The crosslinking material can be present as a mixture with the other components of the aqueous resinous binder (conventionally referred to as a one-pack system), or in a separate composition that is mixed with the other components shortly before application of the coating composition to the substrate (conventionally referred to as a two-pack system).

Any suitable crosslinking materials may be used. Suitable crosslinking materials include aminoplasts and polyisocyanates, and mixtures thereof. Useful aminoplast resins may be based on the addition products of formaldehyde with an amino- or amido-group carrying substance. In an embodiment, condensation products obtained from the reaction of alcohols and formaldehyde with melamine, urea or benzoguanamine are used. While the aldehyde employed may be formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541 (column 2, line 50 through column 7, line 63).

The aminoplast resins may contain methylol or similar alkylol groups, and at least a portion of these alkylol groups may be etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. In an embodiment, the aminoplast resins are substantially alkylated with methanol or butanol.

Any suitable polyisocyanate may be used as a crosslinking agent. The polyisocyanate can be prepared from a variety of isocyanate-containing materials and can be a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanates can be used. Examples of suitable blocking agents include those materials that would unblock at elevated temperatures such as lower aliphatic alcohols including methanol, oximes such as methyl ethyl ketoxime, lactams such as caprolactam and pyrazoles such as dimethylpyrazole.

The amount of the crosslinking material can vary. In an embodiment, the crosslinking material may be present in an amount ranging from 10 to 30, or from 15 to 25 weight percent on a basis of total weight of resin solids (a)+(b)+(c) of the aqueous resinous binder and crosslinking agent.

Component (d), the aqueous dispersion, comprises the reaction product of trimellitic anhydride and a polyol, wherein the molar ratio of trimellitic anhydride to the polyol in the reaction product ranges from 1:2 to 1:4, and wherein the reaction product is further reacted with an anhydride to form another reaction product.

It will be appreciated by those skilled in the art that the polyol should be used in an amount to avoid gelling of the reaction product. Accordingly, in one embodiment, the trimellitic anhydride is reacted with the polyol in a molar ratio of $1:\leqq2$ and/or $1:\leqq4$. In certain non-limiting embodiments, the molar ratio of trimellitic anhydride to polyol can range from 1:2 to 1:4. For example, the molar ratio of trimellitic anhydride to polyol can range from 1:2.3 to 1:3.3. Accordingly, certain non-limiting embodiments can include a molar ratio of trimellitic anhydride to polyol of 1:2.3, 1:2.5, 1:3, and/or 1:3.3. The reaction product produced via the reaction between trimellitic anhydride and the polyol in the ratios described above may result in a range of different compounds. For example, the reaction product may comprise a branched triol having trimellitic anhydride as the "primary branching point" of the branched triol. As used herein, the phrase "primary branching point" is meant to refer to a compound in a molecule wherein the compound connects a plurality of other compounds (branches). For example, as stated above, trimellitic anhydride can be the primary branching point of a branched triol wherein trimellitic anhydride has three polyols attached at different parts thereto. As noted above, however, one or more of the polyols may or may not have additional branching points, which would not be regarded as the "primary branching point". The reaction product produced in the reaction between trimellitic anhydride and the polyol in the ratios described above may also comprise a compound having 2 trimellitic anhydride moieties attached to one another via a polyol moiety, wherein each trimellitic anhydride moiety further has 2 polyol moieties attached thereto. Additionally, in another embodiment, the reaction product produced in the reaction between trimellitic anhydride and the polyol may comprise a branched triol having trimellitic anhydride as the "primary branching point" as well as a polyol moiety attached to a polyol that is attached to the trimellitic anhydride.

In one embodiment, the polyol that is used in the present invention includes, but is not be limited to, a urethane diol, a polyether polyol, polytetramethylene ether glycols, polypropylene glycol, polyethylene glycol, bisphenol A, bisphenol A ethoxylates.

In another embodiment, the polyol is a polyester polyol, which can be, for example, a reaction product of a condensation reaction between a diol and a diacid. The polyester polyol can be prepared in a reaction vessel that is separate from the reaction vessel that contains the trimellitic anhydride with which the polyester polyol will be reacted. Alternatively, the formation of the polyester polyol can occur in situ in the reaction vessel that contains the trimellitic anhydride with which the polyester polyol is reacted. Suitable diols would include, but are not limited to, 1,6-hexanediol, butylethylpropanediol, 1,4-cyclohexanedimethanol, 2-methyl-1,3-propanediol, polytetramethylene ether glycols and its oligomers, polytetrahydrofuran and its oligomers, dipropylene glycol, neopentyl glycol, butane diol, tripropylene glycol, or combinations thereof. Suitable diacids would include, but are not limited to, isophthalic acid, terephthalic acid, 1,4-Cyclohexanediacid, PRIPOL, dimerized fatty acids, maleic anhydride, hexahydrophthalic anhydride, methylhexahydrophthalic anhydride, tetrahydrophthalic anhydride, phthalic anhydride, adipic acid, azelaic acid, or combinations thereof. By way of example, and not limitation, when 2 moles of diol are reacted with 1 mole of diacid via a condensation reaction, the reaction product is a linear polyester polyol having a diol-diacid-diol configuration.

In yet another embodiment, the polyester polyol is formed with small amounts of triol and/or tri-acid. The triols and/or tri-acids would include, but are not limited to, trimethylol propane (TMP) and trimethylol ethane (TME). However, it will be understood that these compounds should not be used in amounts that will cause gelling of the reaction product. It will also be understood that use of triols and/or tri-acids can result in branching in the polyol moiety itself.

In one embodiment, a polyol is reacted with trimellitic anhydride at a temperature ranging from 200° C. to 230° C. for a time period ranging from 6 hours to 10 hours. At this temperature range, the anhydride ring of trimellitic anhydride "opens" and a reaction occurs between the trimellitic anhydride and the hydroxyl functional group of the polyol such that an ester bond is formed between the "opened" trimellitic anhydride and the polyol (hereinafter, this stage will be referred to as the "condensation stage"). Moreover, the reaction between the trimellitic anhydride and the polyol in the "condensation stage" also creates a carboxylic acid functional group on the "opened" trimellitic anhydride. Accordingly, the trimellitic anhydride will have two carboxylic acid functional groups that are available for further reaction. The two carboxylic acid functional groups of the open-ring trimellitic anhydride may then be reacted with additional polyols via condensation reactions to produce a branched triol. Accordingly, the reaction product will have unreacted terminal hydroxyl groups.

At least some of the reaction product that is formed during the "condensation stage", is then further reacted with an anhydride at a temperature ranging from 140° C. to 170° C. in order to render the branched triol dispersible (e.g., water dispersible). Suitable anhydrides that could be used to react with the reaction product would include, but are not be limited to, trimellitic anhydride, phthalic anhydride, hexahydrophthalic anhydride, tetrahydrophthalic anhydride, methyl hexahydrophthalic anhydride, succinic anhydride, maleic anhydride. In one embodiment, 0.33 moles of trimellitic anhydride is added to 1 mole of the reaction product at a temperature ranging from 140° C. to 170° C. At this temperature range, the anhydride ring of trimellitic anhydride "opens" and a reaction occurs between the trimellitic anhydride and a hydroxyl functional group of the reaction product of the "condensation stage" such that an ester bond is formed between the trimellitic anhydride and the reaction product of the "condensation stage" (hereinafter, this stage will be referred to as the "ring opening stage"). The reaction that occurs between trimellitic anhydride and the reaction product of the condensation stage during the "ring opening stage" produces a carboxylic acid functional group on the "opened" trimellitic anhydride, which increases the dispersablity (e.g., water dispersability) of the reaction product produced during the "ring opening stage". Moreover, the resulting reaction product of the "ring opening stage," which is now dispersible, comprises a number of hydroxyl functional groups that can be used, if the dispersion is used in a coating, to cure the coating. For example, hydroxyl functional groups of the polyol can react with a melamine curing agent to form a cross-linked coating.

In one embodiment, the reaction product of the "ring opening stage" can be polymerized, using techniques that are known in the art such as free radical polymerization, with an acrylic and/or vinylic monomer to form a polyester-acrylate copolymer in the aqueous dispersion. Suitable acrylic and/or vinylic monomers which can be used in this reaction include, but are not limited to acrylic or methacrylic alkyl ester derived from alcohols having 1 to about 20 carbon atoms, or vinyl monomers. The expression (meth)acrylate with parenthesis as used herein includes methacrylate and acrylate. Suitable examples are methyl(meth)acrylate, ethyl (meth)acrylate, propyl(meth)acrylate, n-butyl(meth)acrylate, isobutyl(meth) acrylate, t-butyl(meth)acrylate and 2-ethylhexyl(meth)acrylate, maleic acid or fumaric acid dialkylesters in which the alkyl groups have 1 to 20 carbon atoms, vinylaromatics such as styrene, alpha-methylstyrene, vinyltoluene, t-butylstyrene, halogenated vinylbenzenes such as chlorostyrene, and other monomers like vinylchloride, (meth)acrylamide and (meth) acrylonitrile.

Examples of ethylenically unsaturated monomers with a functional group other than the carboxylic acid group or the carboxylic anhydride group (iii) are hydroxyethyl(meth) acrylate, hydroxypropyl(meth)acrylate, and hydroxybutyl (meth)acrylate.

For example, in the case where the reaction product of the "ring opening stage" comprises polymerizable double bonds, a grafting reaction may take place between the reaction product of the "ring opening stage" and the unsaturated monomers. Depending upon the acrylic monomer that is used and the number of polymerizable double bonds that are in the reaction product of the "ring opening stage", the grafting reaction may result in the generation of crosslinked microparticles. Crosslinked microparticle dispersions are particularly useful to control the rheological properties of waterborne coatings.

In an embodiment, the aqueous resinous binders may also contain catalysts to accelerate the cure of the crosslinking agent with reactive groups on the polymer(s). Suitable catalysts for aminoplast cure may be selected from those known in the art and may include acids such as acid phosphates and sulfonic acid or a substituted sulfonic acid. Examples include dodecylbenzene sulfonic acid, paratoluene sulfonic acid, and the like. Suitable catalysts for isocyanate cure include organotin compounds such as dibutyltin oxide, dioctyltin oxide, dibutyltin dilaurate, and the like. The catalyst may be present in varying amounts. In an embodiment, the catalyst may be present in an amount of from 0.05 to 5.0 percent by weight, or from 0.08 to 2.0 percent by weight, based on the total weight of resin solids in the aqueous resinous binder.

In other embodiments, additional ingredients such as pigments and fillers can be present in the binder. Any suitable pigments and fillers may be used. Useful pigments include hiding pigments such as titanium dioxide, zinc oxide, antimony oxide, etc. and organic or inorganic UV opacifying pigments such as iron oxide, transparent red or yellow iron oxide, carbon black, phthalocyanine blue, and the like. Useful fillers include barium sulfate, magnesium silicate, calcium carbonate, and silica. The amount of fillers and pigments can vary. In an embodiment, the fillers and pigments may be present in amounts of up to 60 parts by weight or less based on 100 parts by weight of total solids of the composition. In another embodiment, the pigments may be present in amounts such that the pigment to resin weight ratio is from 0.2 to 3.0:1.0.

Other optional ingredients include anti-oxidants, UV-absorbers and hindered amine light stabilizers, such as for example, hindered phenols, benzophenones, benzotriazoles, triazoles, triazines, benzoates, piperidinyl compounds and mixtures thereof. These ingredients may be added in any suitable amounts. In an embodiment, these ingredients may be added in amounts up to 2 percent based on the total weight of resin solids of the composition. Other optional ingredients may include co-solvents, coalescing aids, defoamers, plasticizers, associative thickeners, bactericides and the like.

The aqueous resinous binder may form one or more components of a multicomponent composite coating for application over a substrate. In an embodiment, the aqueous resinous binder may be used in the primer formulation applied on a substrate under a topcoat.

Coating compositions formulated with the aqueous resinous binder of the present invention may be applied onto the surface of the substrate by any suitable coating process known to those of ordinary skill in the art, for example, by dip coating, direct roll coating, reverse roll coating, curtain coating, spray coating, brush coating, electrostatic spray coating, and combinations thereof. The method and apparatus for applying the coating composition to the substrate is determined in part by the configuration and type of substrate material. The coatings may be applied by these application methods over any suitable substrate including but not limited to either metal or plastic substrates.

In an embodiment, when a primer composition contains the aqueous resinous binder of the present invention, the percent resin solids in the primer composition may range from 45 to 65 percent, or from 50 to 60 percent by weight based on total weight of the composition.

After application of the coating composition to the substrate, the composition can be at least partially dried by evaporating water and solvent (if present) from the surface of the film by air drying at ambient temperature (about 25° C.) or an elevated temperature for a period sufficient to dry the film but not significantly crosslink the components of the composition. Curing then may be done at a temperature of from 120-190° C. for 15 to 60 minutes. In an embodiment, when an unblocked polyisocyanate is used as the curing agent, curing can be done at ambient temperature (20-25° C.).

The coating thickness of the primer coating after final drying and curing can vary. In an embodiment, the coating thickness may be from 0.4 to 2 mils (10 to 50 micrometers), or from 1.0 to 1.5 mils (25 to 38 micrometers).

A topcoat composition may be applied to the surface of the cured primer coating or may be applied to a dried but uncured primer layer and the topcoat and primer cured in one step. The topcoat composition may be a conventional topcoat coating composition as described, for example, in U.S. Pat. Nos. 4,403,003 (column 10, line 6 through column 11, line 49) and 5,368,944 (column 5, line 54 through column 6, line 23). Other suitable compositions may include those formulations commercially available from PPG Industries, Inc. under the tradename HWB and DWB.

After application of the topcoat, a clearcoat may be applied to the surface of the topcoat. In this embodiment, the topcoat is referred to as the "basecoat". The basecoat can be completely cured prior to the application of the clearcoat or the basecoat can be at least partially dried by evaporating water and/or solvent from the surface of the film by air drying at ambient temperature (about 25° C.) or an elevated temperature for a period sufficient to dry the film but not significantly crosslink the components of the basecoat composition. The heating may be only for a short period of time sufficient to ensure that a clear coating composition can be applied over the basecoat coating essentially without dissolving the basecoat coating. Suitable drying conditions depend on the components of the basecoat composition and on the ambient humidity, but generally the drying conditions are similar to those discussed above with respect to the primer coating.

In an embodiment, a clear coating composition may then be applied to the basecoat without substantially curing the basecoat coating to form a substantially uncured basecoat/clearcoat composite coating thereon.

The clearcoat composition can be a waterborne coating or solventborne coating for wet-on-wet application, as desired. In an embodiment, the clear coating composition may be a crosslinkable coating comprising at least one thermosettable film-forming material and at least one crosslinking material. Non-limiting examples of suitable conventional waterborne clearcoats are disclosed in U.S. Pat. No. 5,098,947 (column 3, line 9 through column 8, line 59), and are based on water-soluble acrylic resins. Non-limiting examples of suitable solventborne clearcoats are disclosed in U.S. Pat. Nos. 5,196,485 (column 2, line 13 through column 10, line 47) and 5,814,410 (column 4, line 51 through column 9, line 57), and include polyepoxides and polyacid curing agents. (Suitable conventional powder clearcoats are described in U.S. Pat. No. 5,663,240 (column 2, line 10 through column 5, line 7), and include epoxy functional acrylic copolymers and polycarboxylic acid crosslinking agents.) The clear coating composition can include crosslinking materials and additional ingredients such as are discussed above but not pigments.

After application of the clear coating composition to the substrate, the composite coating can be at least partially dried by evaporating water and/or solvent from the surface of the film by air drying at ambient temperature (about 25° C.) or an elevated temperature for a period sufficient to dry the film. In an embodiment, the clear coating composition may be dried at a temperature and time insufficient to crosslink the crosslinkable components of the composite coating. Suitable drying conditions depend on the components of the clear coating composition and on the ambient humidity, but generally the drying conditions are similar to those discussed above with respect to the primer coating.

After application of the clearcoating or topcoating composition, the composite coating coated substrate may be heated to cure the coating films or layers. In the curing operation, water and/or solvents are evaporated from the surface of the composite coating and the film-forming materials of the coating films are crosslinked. In an embodiment, the heating or curing operation may be carried out at a temperature in the range of from 160° F. to 350° F. (71° C. to 177° C.) for 20 to 40 minutes. Lower or higher temperatures can be used as necessary to activate crosslinking mechanisms. The thickness of the dried and crosslinked composite coating can vary. In an embodiment, the thickness of the dried and crosslinked composite coating may be from 0.2 to 5 mils (5 to 125 micrometers), or from 0.4 to 3 mils (10 to 75 micrometers).

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is having a minimum value equal to or greater than 1 and a maximum value of equal or less than 10.

Further, it should be understood that plural encompasses singular and vice versa; for example, "a" or "an" can include more than one.

Whereas particular embodiments of this invention have been described above for purposes of illustration, it will be evident to those skilled in the art that numerous variations of the details of the present invention may be made without departing from the invention as defined in the appended claims.

The present invention will be further described by reference to the following examples that are merely illustrative of the invention and are not intended to limit the invention to the specifics of the examples. Unless otherwise indicated, all parts are by weight.

EXAMPLES

Example A

A polyester was prepared from the following ingredients:

| | Raw Material | Amount (g) |
| --- | --- | --- |
| Chg 1 | Epon 880 | 188 |
| | Isononanoic Acid | 158 |
| | Ethyltriphenylphosphonium iodide | 0.35 |
| Chg 2 | Macol 98[1] | 492 |
| | 1,4-Cyclohexanedimethanol (CHDM) | 360 |
| Chg 3 | Maleic anhydride | 49 |
| | Trimellitic anhydride | 288 |
| Chg 4 | Dowanol DPM[2] | 165 |
| Chg 5 | Dimethylethanolamine (DMEA) | 52.2 |
| | DI Water | 470 |
| Chg 6 | DI Water | 2329 |

[1]Bisphenol A-ethylene oxide condensate available from BASF Corp.
[2]Dipropylene glycol monomethyl ether available from Dow Chemical Co.

To a four necked, 5 liter reaction flask outfitted with a stirrer, gas inlet, thermometer and condenser was added the contents of Chg 1. The reaction mixture was heated to 150° C. and held until the residual acid value was <3. The contents of Chg 2 and Chg 3 were then added to the flask and the reaction mixture was heated to 190° C. max ensuring that the column head temperature did not exceed 100° C. A slow nitrogen stream helped remove the water condensate. As soon as an acid number of 33 was reached, the reaction was cooled to 135° C. at which point Chg 4 was added with continued cooling to <100° C. When the reaction mixture was cooled to <100° C., an aqueous dispersion was produced by adding Chg 5 and Chg 6. The final dispersion had a solids content of 32% and a pH value of 6.5.

Example B

Polymeric microparticles in accordance with the invention were prepared from the following ingredients:

| | Raw Material | Amount (g) |
| --- | --- | --- |
| Chg 1 | Polyester from Example A | 1500 |
| | DMEA | 2.3 |
| | DI Water | 240 |
| Chg 2 | Hydroxypropylmethacrylate | 33.2 |
| | Styrene | 66.4 |
| | Butyl Acrylate | 66.4 |
| Chg 3 | Isoascorbic acid | 0.511 |
| | DI Water | 5 |
| Chg 4 | Ferrous Ammonium Sulfate | 0.0034 |
| | DI Water | 5 |
| Chg 5 | Hydrogen Peroxide (35%) | 2.34 |
| | DI Water | 20 |
| Chg 6 | DMEA | 4.58 |
| | DI Water | 5 |

To a four necked, 5 liter reaction flask outfitted with a stirrer, gas inlet, thermometer, and condenser was added the contents of Chg 1. While the reaction was heating to 35° C. vacuum was applied to remove the dissolved oxygen. Upon reaching 35° C., the vacuum was broken with a nitrogen stream and the reaction was continued under nitrogen atmosphere. Chg 2 was added followed by stirring for 5 minutes, then Chg 3 and 4 were added followed by stirring for 5 minutes. Chg 5 was then added all at once and within 2 minutes an exotherm ensued. The reaction temperature reached 55° C. within 10 minutes. The reaction was then heated to 65° C. and held for 1 hour to ensure complete monomer conversion. The reaction was then cooled to 35° C. and Chg 6 was added. A nearly transparent dispersion with a solids content of 35% and pH of 6.8 was obtained.

Example C

A polyester was prepared from the following ingredients:

|       | Raw Material | Amount (g) |
|-------|--------------|------------|
| Chg 1 | Dipropylene glycol | 429 |
|       | 1,6-Hexanediol | 378 |
|       | Isophthalic acid | 398 |
|       | Maleic anhydride | 78.4 |
|       | Butyl stannoic acid | |
| Chg 2 | mPEG 350[1] | 70 |
|       | Trimethylolpropane | 160.8 |
|       | Trimellitic anhydride | 307.2 |
| Chg 3 | DMEA | 43.3 |
|       | DI Water | 390 |
| Chg 4 | DI Water | 2126 |

[1]Methoxypolyethylene glycol available from BASF Corp.

To a four necked, 5 liter reaction flask outfitted with a stirrer, gas inlet, packed column, thermometer and condenser was added the contents of Chg 1. The reaction mixture was heated to 210° C. maximum ensuring that the column head temperature did not exceed 100° C. The reaction was held until the residual acid value was <3. The reaction was cooled to 150° C. and Chg 2 was added. The reaction mixture was then heated to 195° C. maximum and held until an acid value of 20 was reached. The reaction mixture was then cooled to <100° C., and an aqueous dispersion was produced by adding Chg 3 and Chg 4. The final dispersion had a solids content of 40% and a pH value of 6.5.

Example D

Polymeric microparticles in accordance with the invention were prepared from the following ingredients:

|       | Raw Material | Amount (g) |
|-------|--------------|------------|
| Chg 1 | Polyester from Example C | 1925 |
|       | DMEA | 0 |
|       | DI Water | 100 |
| Chg 2 | Hydroxypropylmethacrylate | 51.3 |
|       | Styrene | 102.7 |
|       | Butyl Acrylate | 102.7 |
| Chg 3 | Isoascorbic acid | 0.791 |
|       | DI Water | 10 |
| Chg 4 | Ferrous Ammonium Sulfate | 0.00524 |
|       | DI Water | 5 |
| Chg 5 | Hydrogen Peroxide (35%) | 3.61 |
|       | DI Water | 10 |
| Chg 6 | DMEA | 4.89 |
|       | DI Water | 9.8 |

To a four necked, 5 liter reaction flask outfitted with a stirrer, gas inlet, thermometer, and condenser was added the contents of Chg 1. While the reaction was heating to 35° C. vacuum was applied to remove the dissolved oxygen. Upon reaching 35° C., the vacuum was broken with a nitrogen stream and the reaction was continued under nitrogen atmosphere. Chg 2 was added followed by stirring for 5 minutes, then Chg 3 and 4 were added followed by stirring for 5 minutes. Chg 5 was then added all at once and within 2 minutes an exotherm ensued. The reaction temperature reached 51° C. within 10 minutes. The reaction was then heated to 65° C. and held for 1 hour to ensure complete monomer conversion. The reaction was then cooled to 35° C. and Chg 6 was added. A nearly transparent dispersion with a solids content of 44% and pH of 6.8 was obtained.

Example E

A polyester was prepared from the following ingredients:

|       | Raw Material | Amount (g) |
|-------|--------------|------------|
| Chg 1 | CHDM | 1037 |
|       | pTHF 250[1] | 1800 |
|       | Maleic anhydride | 176 |
|       | Trimellitic anhydride | 1037 |
| Chg 2 | DMEA | 128 |
|       | DI Water | 1153 |
| Chg 3 | DI Water | 5283 |

[1]Polytetrahydrofuran available from BASF Corp . . .

To a four necked, 5 liter reaction flask outfitted with a stirrer, gas inlet, thermometer and condenser was added the contents of Chg 1. The reaction mixture was heated to 185° C. and held until the acid value was 26. A slow nitrogen stream helped remove the water condensate. As soon as an acid number of 26 was reached, the reaction was cooled to <100° C. When the reaction mixture was cooled to <100° C., an aqueous dispersion was produced by adding Chg 2 and Chg 3. The final dispersion had a solids content of 37% and a pH value of 6.5.

Example F

A urethane diol in accordance with the invention was prepared from the following ingredients:

|       | Raw Material | Amount (g) |
|-------|--------------|------------|
| Chg 1 | Jeffamine D 230[1] | 1150 |
| Chg 2 | Propylene carbonate | 1683 |
| Chg 3 | DI Water | 382 |

[1]Polyoxyalkylenediamine available from Huntsman.

To a four necked, 5 liter reaction flask outfitted with a stirrer, gas inlet, thermometer and condenser was added the contents of Chg 1. The reaction mixture was heated to 60° C. and Chg 2 was added dropwise ensuring that the temperature did not exceed 120° C. After the addition of Chg 2 was complete, the reaction was heated to 120° C. and held until the mEq amine value was <0.5. The reaction was cooled to 80° C. and thinned with Chg 3.

Example G

A urethane triol in accordance with the invention was prepared from the following ingredients:

| | Raw Material | Amount (g) |
|---|---|---|
| Chg 1 | Diethylene triamine | 155 |
| Chg 2 | Propylene carbonate | 505 |
| Chg 3 | DI Water | 157 |

To a four necked, 2 liter reaction flask outfitted with a stirrer, gas inlet, thermometer and condenser was added the contents of Chg 1. The reaction mixture was heated to 60° C. and Chg 2 was added dropwise ensuring that the temperature did not exceed 120° C. After the addition of Chg 2 was complete, the reaction was heated to 120° C. and held until the mEq amine value was <0.5. The reaction was cooled to 80° C. and thinned with Chg 3.

Example H

A hydroxyl group containing material derived from the reaction of an epoxy group containing material with a phosphorus acid was prepared from the following ingredients:

| | Raw Material | Amount (g) |
|---|---|---|
| Chg 1 | Phosphoric acid (85%) | 200 |
| | Butyl glycol | 762 |
| | Ethyltriphenylphosphonium iodide | 0.8 |
| Chg 2 | Epon 828[1] | 829 |
| | Butyl glycol | |
| Chg 3 | Butyl glycol | 170 |

[1]Polyglycidylether-Bisphenol A reaction product available from Reliance Chemical.

To a four necked, 3 liter reaction flask outfitted with a stirrer, gas inlet, thermometer and condenser was added the contents of Chg 1. The reaction mixture was heated to 80° C. and Chg 2 was added dropwise ensuring that the temperature did not exceed 120° C. After the addition of Chg 2 was complete, the reaction was heated to 120° C. and held until the AV (s) was 65. The reaction was cooled to 80° C. and thinned with Chg 3.

Example 1

An aqueous resinous binder in accordance with the invention was prepared as follows:

A pigment paste was first made with the following ingredients:

| | |
|---|---|
| 85.71 g | Polymeric microparticles of Example B |
| 7.25 g | Deionized water |
| 0.60 g | Dimethyl ethanol amine (50% Solution) |
| 2.00 g | Drewplus L108 Defoamer from Ashland Chemicals |
| 3.70 g | Byk-181 Grind additive from Byk-Chemie |
| 4.00 g | Carbon Black available from Columbian Chemicals |
| 2.00 g | Carbon Black available from Cabot Specialty Chemicals |
| 1.00 g | Silica from DeGussa |
| 118.0 g | Barium Sulfate from Solvay |
| 5.00 g | Titanium Dioxide available from DuPont |

These ingredients were first dispersed with a high speed cowls agitator for 1 hour, and then milled for 1½ hours on an Eiger media mill.

To this paste, the following ingredients were added with agitation:

| | |
|---|---|
| 114.29 g | Polymeric microparticles of Example B |
| 0.84 g | Dimethyl ethanol amine (50% Solution) |
| 20.00 g | Resimene 745 from INEOS |
| 1.60 g | Mineral Spirits |
| 5.20 g | M-Pyrol |
| 1.20 g | Octanol |
| 2.09 g | Byk-346 Additive from Byk-Chemie |
| 1.92 g | Byk-381 Additive from Byk-Chemie |
| 11.36 g | Urethanediol of Example F |
| 12.50 g | Epoxy-phosphorus acid reaction product of Example H |
| 45.60 g | Deionized water |

Sample was reduced with deionized water to 34 seconds #4 Ford cup viscosity.

Example 2

Comparative

An aqueous resinous binder similar to Example 1 but without the urethanediol and the epoxy-phosphorus acid reaction product was prepared from the following ingredients:

To the pigment paste described in Example 1, the following ingredients were added with agitation:

| | |
|---|---|
| 142.86 g | Polymeric microparticles of Example B |
| 1.36 g | Dimethyl ethanol amine (50% Solution) |
| 20.00 g | Resimene 745 from INEOS |
| 1.60 g | Mineral Spirits |
| 5.20 g | M-Pyrol |
| 1.20 g | Octanol |
| 2.09 g | Byk-346 Additive from Byk-Chemie |
| 1.92 g | Byk-381 Additive from Byk-Chemie |
| 49.20 g | Deionized water |

Sample was reduced with deionized water to 34 seconds #4 Ford cup viscosity.

Example 3

Comparative

An aqueous resinous binder similar to Example 1 but without the urethane diol was prepared from the following ingredients:

To the pigment paste of Example 1, the following ingredients were added with agitation:

| | |
|---|---|
| 142.86 g | Polymeric microparticles of Example B |
| 1.70 g | Dimethyl ethanol amine (50% Solution in deionized water) |
| 20.00 g | Resimene 745 from INEOS |
| 1.60 g | Mineral Spirits |
| 5.20 g | M-Pyrol |
| 1.20 g | Octanol |
| 2.09 g | Byk-346 Additive from Byk-Chemie |
| 1.92 g | Byk-381 Additive from Byk-Chemie |
| 12.50 g | Epoxy-phosphorus acid reaction product of Example H |
| 49.20 g | Deionized water |

Sample was reduced with deionized water to 34 seconds #4 Ford cup viscosity.

Example 4

Comparative

An aqueous resinous dispersion similar to Example 1 but without the epoxy-phosphorus acid reaction product was prepared from the following ingredients:

To the pigment paste described in Example 1, the following ingredients were added with agitation:

| | |
|---|---|
| 114.29 g | Polymeric microparticles of Example B |
| 2.14 g | Dimethyl ethanol amine (50% Solution) |
| 20.00 g | Resimene 745 from INEOS |
| 1.60 g | Mineral Spirits |
| 5.20 g | M-Pyrol |
| 1.20 g | Octanol |
| 2.09 g | Byk-346 Additive from Byk-Chemie |
| 1.92 g | Byk-381 Additive from Byk-Chemie |
| 11.36 g | Urethanediol of Example F |
| 35.20 g | Deionized water |

Sample was reduced with deionized water to 34 seconds #4 Ford cup viscosity.

Example 5

An aqueous resinous binder in accordance with the invention was prepared as follows:

A pigment paste was first made with the following ingredients in a similar manner to Example 1:

| | |
|---|---|
| 14.46 g | Polyester of Example E |
| 5.00 g | Deionized water |
| 0.18 g | Dimethyl ethanol amine (50% Solution) |
| 0.51 g | Drewplus L108 Defoamer from Ashland Chemicals |
| 0.93 g | Byk-181 Grind additive from Byk-Chemie |
| 0.75 g | Carbon Black available from DeGussa |
| 0.25 g | Silica from DeGussa |
| 21.25 g | Barium Sulfate from Solvay |
| 1.25 g | Titanium Dioxide available from DuPont |
| 1.50 g | Magnesium Silicate from Norwegian Talc |

To this paste, the following ingredients were added with agitation:

| | |
|---|---|
| 113.74 g | Polymeric microparticles of Example D |
| 3.33 g | Dimethyl ethanol amine (50% Solution) |
| 25.00 g | Resimene 745 from INEOS |
| 2.00 g | Mineral Spirits |
| 2.09 g | Byk-346 Additive from Byk-Chemie |
| 1.92 g | Byk-381 Additive from Byk-Chemie |
| 17.44 g | Urethanediol of Example F |
| 3.33 g | Additol XL180[1] |
| 11.00 g | Deionized water |

[1]Epoxy-phosphorus acid reaction product available from Solutia.

Sample was reduced with deionized water to 39 seconds #4 Ford cup viscosity.

Example 6

An aqueous resinous binder in accordance with the invention was prepared as follows:

To the pigment paste described in Example 1, the following ingredients were added with agitation:

| | |
|---|---|
| 114.29 g | Polymeric microparticles of Example B |
| 0.84 g | Dimethyl ethanol amine (50% Solution) |
| 20.00 g | Resimene 745 from INEOS |
| 1.60 g | Mineral Spirits |
| 5.20 g | M-Pyrol |
| 1.20 g | Octanol |
| 2.09 g | Byk-346 Additive from Byk-Chemie |
| 1.92 g | Byk-381 Additive from Byk-Chemie |
| 17.44 g | Urethane triol of Example G |
| 12.50 g | Epoxy-phosphorus acid reaction product of Example H |
| 45.60 g | Deionized water |

Sample was reduced with deionized water to 34 seconds #4 Ford cup viscosity.

The above aqueous resinous binders were evaluated as primers under topcoats as follows: The test substrate was 4"×12"ACT EZG panels electrocoated with ED6060, a cationically electrodepositable primer commercially available from PPG Industries. These panels are available from ACT Laboratories of Hillsdale, Mich.

Each of the primer compositions was spray applied (2 coats automated spray with 60 second ambient flash between coats) at 60% relative humidity and 21° C. to give a dry film thickness of 40 to 50 microns. The coated panels were flashed for 5 minutes at ambient temperature, and dehydrated for 5 minutes at 80° C. and then cured for 25 minutes at 140° C.

The coated panels were then topcoated with MB9040 black monocoat commercially available from PPG Industries. The topcoat was also applied in two coats by automated spray, flashed for 10 minutes at ambient conditions and cured for 25 minutes at 140° C., to a dry film thickness of 45 microns. The coated panels were evaluated for gloss, hardness, solvent resistance and appearance.

Gloss was measured with a micro-tri-gloss meter available from Byk-Gardner. Higher numbers indicate higher, more desirable gloss.

The hardness was measured on the primed only panels. This was done using a Pendulum Hardness Tester and measuring according to the König Method. The higher the value, the greater the hardness.

Solvent Resistance was tested on the primed only panels as well. This was done by placing a puddle of about 10 drops of acetone onto the panel and waiting for 10 seconds. After 10 seconds the acetone was removed with a cloth towel and a wooden spatula was scratched across the surface where the acetone had been. Rating is determined by the amount of mar left behind by the wooden blade. A passed ("P") rating indicates little if any mar. A failed ("F") rating indicates significant marring.

Appearance was measured on the topcoated panels. Appearance was measured using a BYK-wavescan (commercially available from BYK-Gardner) with data collected on the longwave and shortwave numbers. The instrument optically scans the wavy, light dark pattern on the surface over a distance of 10 cm and detects the reflected light intensity point by point. The measured optical profile is divided into long term waviness (structure size 0.6-10 mm) and short-term waviness (structure size 0.1-0.6 mm). The lower the value, the better the appearance.

The results of the testing is reported in the Table 1 below.

TABLE 1

Coating Performance Results

| Example No. | Appearance | | Gloss | % TS | 140° C. König | Solvent Resistance |
|---|---|---|---|---|---|---|
| | LW | SW | | | | |
| 1 | 5 | 19 | 66/90 | 54 | 118 | P |
| 2 | 8 | 28 | 40/80 | 50 | 98 | F |
| 3 | 6 | 24 | 62/89 | 52 | 144 | P |
| 4 | 6 | 20 | 36/76 | 55 | 67 | F |
| 5 | 5 | 18 | 70/90 | 56 | 110 | P |
| 6 | 5 | 20 | 65/89 | 54 | 115 | P |

Example I

An aqueous dispersion in accordance with one embodiment of the present invention was prepared from the following ingredients:

| | Raw Material | Amount (g) |
|---|---|---|
| Chg 1 | Neopentyl glycol | 275 |
| | Dipropylene glycol | 362 |
| | Isophthalic acid | 448 |
| | Butyl stannoic acid | 0.4 |
| | Trimellitic anhydride | 173 |
| Chg 2 | Trimellitic anhydride | 57 |
| Chg 3 | DOWANOL DPM[1] | 89 |
| Chg 4 | DMEA (Dimethylamine) | 56.4 |
| | DI Water (Deionized water) | 508 |
| Chg 5 | DI Water | 855 |

[1] Available from Dow Chemical Co.

To a four necked, 5 liter reaction flask outfitted with a stirrer, gas inlet, thermometer, packed column and condenser was added the contents of Chg 1. The reaction mixture was heated in stages to 220° C. and held until the acid value was <4. Care was taken that the distillate temperature did not exceed 100° C. Upon reaching the target acid value range, a sample was removed, and the Gardner Holdt viscosity of U was measured at 60% TS in Butyl Cellosolve. Vacuum was then applied to remove any residual water as the reaction was cooled to 160° C. The contents of Chg 2 were then added to the flask at 160° C. and the reaction mixture was held for 30 minutes. The reaction mixture was then cooled and at 150° C. the contents of Chg 3 were added. When the reaction mixture was cooled to <100° C., an aqueous dispersion was produced by adding Chg 4 and Chg 5. The final dispersion had a solids content of 44% and a pH value of 6.9.

Example 7

A pigment paste was made with the following ingredients:

| Raw Material | Amount (g) |
|---|---|
| Example B | 80.00 |
| Deionized water | 10.92 |
| Dimethyl ethanol amine (50% Solution) | 0.57 |
| Drewplus L108 Defoamer | 2.03 |
| Byk-181 Grind additive | 3.71 |
| Carbon Black | 0.27 |
| Silica | 1.00 |

-continued

| Raw Material | Amount (g) |
|---|---|
| Barium Sulfate | 51.89 |
| Titanium Dioxide | 46.84 |

These ingredients were dispersed with a high speed cowls agitator for 1 hour, and then milled for 1½ hours on an Eiger media mill.

After the pigment paste was dispersed and milled, the following ingredients were added to the pigment paste:

| Raw Materials | Amount (g) |
|---|---|
| Aqueous Dispersion of Example I | 98.82 |
| Dimethyl ethanol amine (50% Solution) | 1.33 |
| Resimene 745 | 19.66 |
| Mineral Spirits | 1.60 |
| M-Pyrol | 3.00 |
| Octanol | 1.20 |
| Byk-346 Additive | 2.09 |
| Byk-381 Additive | 1.92 |
| Urethanediol (component B) | 11.36 |
| Neutralized phosphatized epoxy solution (component C) | 12.00 |
| Deionized water | 12.92 |

The paint sample was then reduced to 47 seconds #4 Din Cup viscosity.

Example 7 was evaluated as a primer under topcoats as follows: The test substrate was 4"×12"ACT EZG panels electrocoated with ED6060, a cationically electrodepositable primer commercially available from PPG Industries. These panels are available from ACT Laboratories of Hillsdale, Mich.

Example 7 was spray applied (2 coats automated spray with 60 second ambient flash between coats) at 60% relative humidity and 21° C. to give a dry film thickness of 40 to 50 microns. The coated panels were flashed for 5 minutes at ambient temperature, and dehydrated for 5 minutes at 80° C. and then cured for 25 minutes at 140° C.

The coated panels were then topcoated with MB9040 black monocoat commercially available from PPG Industries. The topcoat was also applied in two coats by automated spray, flashed for 10 minutes at ambient conditions and cured for 25 minutes at 140° C., to a dry film thickness of 45 microns. The coated panels were evaluated for gloss, hardness, solvent resistance and appearance.

Gloss was measured with a micro-tri-gloss meter available from Byk-Gardner. Higher numbers indicate higher, more desirable gloss.

The hardness was measured on the primed only panels. This was done using a Pendulum Hardness Tester and measuring according to the König Method. The higher the value, the greater the hardness.

Solvent Resistance was tested on the primed only panels as well. This was done by placing a puddle of about 10 drops of acetone onto the panel and waiting for 10 seconds. After 10 seconds the acetone was removed with a cloth towel and a wooden spatula was scratched across the surface where the acetone had been. Rating is determined by the amount of mar left behind by the wooden blade. A passed ("P") rating indicates little if any mar. A failed ("F") rating indicates significant marring.

The results of the testing is reported in the Table 2 below.

TABLE 2

| | Coating Performance Results | | | |
|---|---|---|---|---|
| Example No. | Gloss | % TS | 140° C. König | Solvent Resistance |
| 7 | 85/95 | 57 | 200 | P |

Whereas particular embodiments of this invention have been described above for purposes of illustration, it will be evident to those skilled in the art that numerous variations of the details of the present invention may be made without departing from the invention as defined in the appended claims.

What is claimed is:

1. An aqueous resinous binder comprising:
   (a) polymeric microparticles obtained by aqueous phase addition polymerization of a monomer component comprising one or more addition polymerizable ethylenically unsaturated monomers in the presence of a polymer dispersed in aqueous medium in which the polymer is selected from a polyester, a polyurethane and an acrylic copolymer including mixtures thereof,
   (b) a water-dilutable urethane polyol,
   (c) a hydroxyl group-containing material derived from the reaction of an epoxy group-containing material with a phosphorus acid; and
   (d) an aqueous dispersion of a reaction product, said reaction product produced by the steps of: reacting trimellitic anhydride and a polyol to form an intermediate reaction product, wherein the molar ratio of trimellitic anhydride to the polyol is from 1:2 to 1:4; and reacting the intermediate reaction product with an anhydride to form said reaction product.

2. The aqueous resinous binder of claim 1 in which the aqueous resinous binder has a resin solids content of from 20 to 60 percent by weight based on total weight of (a)+(b)+(c)+(d).

3. The aqueous resinous binder of claim 1 in which the addition polymerizable ethylenically unsaturated monomers are selected from alkyl esters of acrylic or methacrylic acid, vinylidene halides and hydroxyalkyl esters of acrylic or methacrylic acid including mixtures thereof.

4. The aqueous resinous binder of claim 3 comprising a hydroxyalkyl ester of acrylic acid or methacrylic acid containing from 1 to 4 carbon atoms in the hydroxyalkyl group.

5. The aqueous resinous binder of claim 4 which has a hydroxyl value between 75 and 250.

6. The aqueous resinous binder of claim 1 in which the polyester has an acid number between 10 and 60.

7. The aqueous resinous binder of claim 1 in which the polyester is formed from reacting a polycarboxylic acid with a polyol.

8. The aqueous resinous binder of claim 7 in which a portion of the polycarboxylic acid is selected from maleic acid, fumaric acid and itaconic acid.

9. The aqueous resinous binder of claim 1 in which the urethane polyol is prepared by the reaction of a cyclic carbonate with a polyamine.

10. The aqueous resinous binder of claim 9 in which the cyclic carbonate is a linear or branched aliphatic cyclic carbonate.

11. The aqueous resinous binder of claim 10 in which the cyclic carbonate is a monocarbonate.

12. The aqueous resinous binder of claim 9 in which the polyamine is a polyprimary amine.

13. The aqueous resinous binder of claim 1 in which the hydroxyl functional material (c) is the reaction product of a polyepoxide and a phosphorus acid.

14. The aqueous resinous binder of claim 13 in which the polyepoxide is a polyglycidyl ether of a polyphenol.

15. The aqueous resinous binder of claim 14 in which the phosphorus acid is selected from phosphoric acid and an organic phosphonic acid.

16. The aqueous resinous binder of claim 1 in which the polymeric microparticles (a) are present in the aqueous resinous binder in amounts of 40 to 90 percent by weight based on total weight of resin solids.

17. The aqueous resinous binder of claim 1 in which the water-dilutable urethane polyol is present in the composition in amounts of 5 to 30 percent by weight based on weight of resin solids.

18. The aqueous resinous binder of claim 1 in which component (c) is present in the composition in amounts of 2 to 20 percent by weight based on total weight of resin solids.

19. The aqueous resinous binder of claim 1, which further comprises a curing agent.

20. The aqueous resinous binder of claim 19 in which the curing agent is selected from polyisocyanates including blocked polyisocyanates and aminoplasts.

21. The aqueous resinous binder of claim 19 in which the curing agent is present in amounts of 10 to 30 percent by weight based on total weight of resin solids in the aqueous resinous binder and curing agent.

22. A multilayer composite coating comprising a primer, a basecoat adhered to the primer and a clearcoat adhered to the basecoat, wherein the primer is derived from the aqueous resinous binder of claim 19.

23. The aqueous resinous binder of claim 1, which further comprises pigments.

24. The aqueous resinous binder of claim 23 in which the pigment to resin weight ratio is from 0.2:1.0 to 3.0:1.0.

25. The aqueous resinous binder of claim 1, in which the molar ratio of trimellitic anhydride to the polyol in the reaction product ranges from 1:2.3 to 1:3.3.

26. A multilayer composite coating comprising a primer, a basecoat adhered to the primer and a clearcoat adhered to the basecoat, wherein the primer is derived from the aqueous resinous binder of claim 1.

* * * * *